US008255536B2

(12) United States Patent
Chen

(10) Patent No.: US 8,255,536 B2
(45) Date of Patent: Aug. 28, 2012

(54) BANDWIDTH AND LATENCY CONTROLLER

(75) Inventor: Rong Chao Chen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 480 days.

(21) Appl. No.: 12/053,267

(22) Filed: Mar. 21, 2008

(65) Prior Publication Data
US 2009/0240808 A1    Sep. 24, 2009

(51) Int. Cl.
*G06F 15/173* (2006.01)
(52) U.S. Cl. .................... 709/226; 709/223
(58) Field of Classification Search .................. None
See application file for complete search history.

(56) References Cited

U.S. PATENT DOCUMENTS

| | | | | |
|---|---|---|---|---|
| 5,883,716 A * | 3/1999 | Mark et al. | ..................... | 356/464 |
| 6,578,077 B1 | 6/2003 | Rakoshitz et al. | | |
| 6,647,419 B1 * | 11/2003 | Mogul | ......................... | 709/226 |
| 6,895,588 B1 | 5/2005 | Ruberg | | |
| 6,922,724 B1 | 7/2005 | Freeman et al. | | |
| 7,246,171 B1 * | 7/2007 | Ambrose | ....................... | 709/233 |
| 7,433,312 B2 * | 10/2008 | Yoshihara et al. | ............ | 370/235 |
| 7,493,407 B2 * | 2/2009 | Leedom et al. | ................ | 709/232 |
| 7,580,972 B2 * | 8/2009 | Jones et al. | .................... | 709/203 |
| 7,647,411 B1 * | 1/2010 | Schiavone et al. | ........... | 709/229 |
| 2002/0167930 A1 * | 11/2002 | Pearl | ............................ | 370/345 |
| 2003/0023717 A1 | 1/2003 | Lister | | |
| 2005/0120131 A1 * | 6/2005 | Allen | ............................ | 709/233 |
| 2005/0128951 A1 * | 6/2005 | Chawla et al. | ................ | 370/235 |
| 2005/0144186 A1 | 6/2005 | Hesselink et al. | | |
| 2005/0163060 A1 * | 7/2005 | Riley et al. | ..................... | 370/254 |
| 2006/0104313 A1 * | 5/2006 | Haner et al. | ................... | 370/517 |
| 2006/0198391 A1 * | 9/2006 | Kim et al. | ........................ | 370/466 |
| 2006/0218285 A1 | 9/2006 | Talwar et al. | | |
| 2006/0259612 A1 | 11/2006 | De Oliveira et al. | | |
| 2007/0008902 A1 * | 1/2007 | Yaramada et al. | ............ | 370/252 |
| 2007/0121678 A1 * | 5/2007 | Brooks et al. | ................ | 370/505 |
| 2007/0124474 A1 | 5/2007 | Margulis | | |
| 2007/0174410 A1 | 7/2007 | Croft et al. | | |
| 2007/0198656 A1 | 8/2007 | Mazzaferri et al. | | |
| 2008/0244083 A1 * | 10/2008 | Guthrie et al. | ................ | 709/232 |

OTHER PUBLICATIONS

Lubonski, et al., "A Conceptual Architecture for Adaptation in Remote Desktop Systems Driven by the User Perception of Multimedia", IEEE, Oct. 2005, pp. 891-895.
Sullivan, "Provision Networks Working with Microsoft to Deliver Enhancements to the Terminal Services Platform", at http://www.provisionnetworks.com/news/2007/22007_PN_RDP_MSFT.aspx>>, Provision Networks, 2006, pp. 1-2.

* cited by examiner

*Primary Examiner* — Bunjob Jaroenchonwanit
(74) *Attorney, Agent, or Firm* — Lee & Hayes, PLLC

(57) ABSTRACT

Systems and methods described relate to controlling bandwidth and latency in a remote computing environment. A controller establishes a remote session between a client and a remote server. Data transfer between the client and the remote server is routed through the controller. The controller regulates bandwidth consumption and latency in the remote session by simulating a session bandwidth that can be less than the available bandwidth and by injecting delays into data packets transferred in the remote session. Such systems and methods can be used to prioritize remote client sessions and test deployment of applications in a remote computing environment.

18 Claims, 6 Drawing Sheets

BANDWIDTH AND LATENCY CONTROLLER

BACKGROUND

In a typical remote computing environment, a server computer can host applications for use by remote client devices. A user can remotely access the applications by establishing a connection over a network between the server computer on one end and a remote client device at the user end. The connection creates a remote session on the server computer during which the user can interact with and use applications hosted on the server computer as if the applications were present locally on the remote client device.

When multiple client devices (clients) establish connections with the server computer, the available network bandwidth is distributed amongst the clients to enable simultaneous data transfer, between the multiple clients and the server. Typically, the distribution of bandwidth is random and the clients compete with each other for the available bandwidth. Therefore, deploying large applications, or large number of data requests and transfer of large volumes of data can lead to traffic congestion in the network. Traffic congestion leads to uncontrolled delay in data transfer. Delays beyond acceptable levels can cause interruptions in the application thus hampering the end-user experience.

SUMMARY

This summary is provided to introduce simplified concepts related to controlling bandwidth and latency in a remote computing environment, which are further described below in the Detailed Description. This summary is not intended to identify essential features of the claimed subject matter, nor is it intended for use in determining the scope of the claimed subject matter.

In one implementation, bandwidth distribution and latency in a remote computing environment is determined, where size of available bandwidth is determined, and a predetermined size of bandwidth is allocated to each client device in the remote computing environment. Predetermined network latency can also be injected onto data packets between server computer and client devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed to techniques for controlling bandwidth allocation and latency in a remote computing environment. The techniques involve using a bandwidth and latency controller, also referred to as controller, to provide end to end bandwidth and latency control in a network. Towards this end, the controller can simulate network latency and session bandwidth that is smaller than the available physical bandwidth.

In one implementation, the controller allocates a session bandwidth to each remote session so that the remote clients need not compete for the available bandwidth. The size of the session bandwidth may be predetermined based on which remote client uses the session. In another implementation, the controller allocates a session bandwidth to a group of remote client sessions instead of allocating a session bandwidth to each remote client session. Further, the controller can vary the size of the allocated session bandwidth based on the applications deployed in the session. The size of the session bandwidth can thus vary depending on the client or groups of clients, the application in use, or other control settings that may be specified.

To simulate a session bandwidth for a remote session, the controller injects delays into data packets while the data packets are transferred in the remote session. By this, the controller can ensure that the rate of data transfer in the remote session is in conformation with the session bandwidth. Further, this also controls network latency by injecting predetermined delay value to data packets between remote session and the client.

The controller can thus provide end to end bandwidth allocation and latency control for individual remote clients or groups of clients, and remote applications deployed. The controller can also prioritize remote connections based on the client groups and applications. In addition, such a simulation of bandwidth can also be used to test deployment of applications in a remote environment.

The techniques described herein may be used in many different operating environments and systems. Multiple and varied implementations are described below. An exemplary environment that is suitable for practicing various implementations is discussed in the following section.

Exemplary systems and methodologies for bandwidth and latency control, are described in a general context of computer-executable instructions (program modules) being executed by a computing device, such as a personal computer. While the systems and methods are described in the foregoing contexts, acts and operations described hereinafter is implemented in hardware or other forms of computing platforms.

Exemplary Computing Environment

Figure 1:
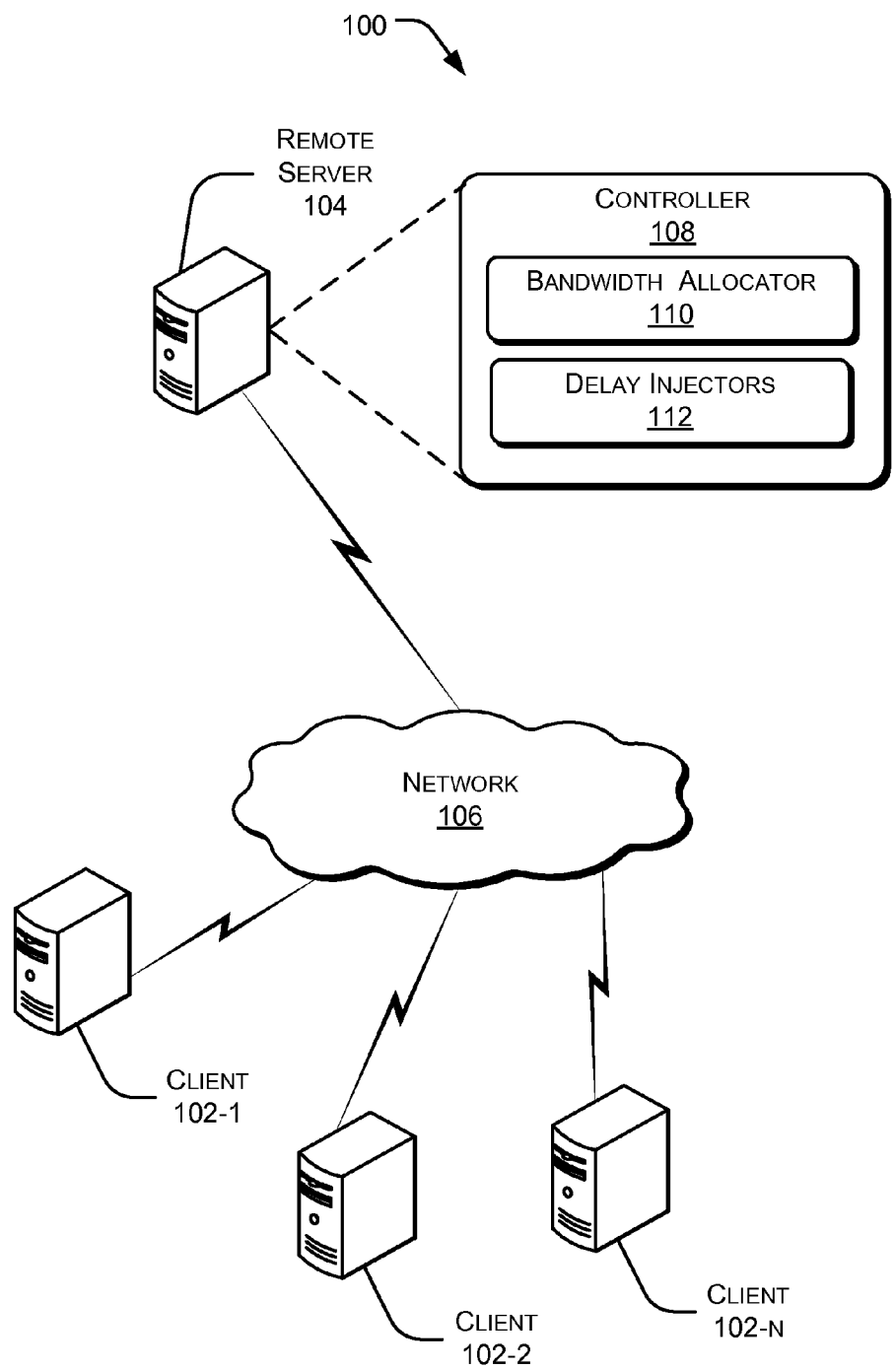
FIG. 1 is a block diagram illustrating an exemplary computing environment with a controller for controlling the bandwidth and latency in a remote computing environment.

FIG. 1 shows an exemplary computing environment 100 for implementing a bandwidth and latency controller in a remote computing environment. The computing environment 100 includes client devices 102-1, 102-2, . . . , 102-N, also referred to as clients 102 that communicate with a remote server 104, via a network 106.

The client devices 102 may be implemented in any number of ways including, for example, as general purpose computing devices, laptops, mobile computing devices, PDAs, communication devices, GPS-equipped devices, and so on.

The remote server 104 may also be implemented in many ways including, for example, as a stand alone general purpose computing device or mainframe, or as a cluster of servers (e.g., arranged in a server farm). The remote server may be any remote server known in the art, for example the Terminal Services® server, available from the Microsoft® Corporation.

The network 106 may include, but is not limited to, a Local Area Network (LAN), a Wide Area Network (WAN), and a Metropolitan Area Network (MAN). Further, the network 106 is representative of a wireless network, a wired network, or a combination thereof.

In one implementation, the remote server 104 includes a controller 108 for controlling bandwidth distribution and latency in the remote computing environment. When a client device, such as the client 102-1, sends a request to the remote server 104 to establish a connection and create a remote session, the request is handled by the controller 108. The controller 108 accepts the request and determines whether the remote server 104 can establish a connection. On receiving confirmation from the remote server 104, the controller 108 establishes a connection with the client device 102-1 (i.e., creates a remote client session) and allocates a session bandwidth to the remote client session.

To allocate the session bandwidth, the controller 108 includes a bandwidth allocator 110. The bandwidth allocator 110 determines the size of available bandwidth and the predetermined size of bandwidth that may be allocated to the client 102-1. The predetermined size of bandwidth may be a predetermined percentage of the available bandwidth or a numerical value of bandwidth size.

If the predetermined size of bandwidth is less than the available physical bandwidth, the bandwidth allocator 110 allocates the predetermined size of bandwidth as the session bandwidth. Alternatively, the bandwidth allocator 110 determines privileges associated with the client 102-1 and allocates the session bandwidth accordingly. For example, if the client 102-1 has administrative privileges, the bandwidth allocator 110 may allocate the available bandwidth completely to the client. In other cases, the bandwidth allocator 110 may allocate a percentage of the available bandwidth, such as 10% or 50% of the available physical bandwidth, as the session bandwidth.

Once the controller 108 establishes the remote session and allocates a session bandwidth to the remote session, the controller 108 starts forwarding data traffic between the client 102-1 and remote server 104. Therefore, the controller 108 sets up a new path of communication between the client 102-1 and the server 104, which is routed through the controller 108.

While forwarding the data traffic between the client 102-1 and remote server 104, the controller 108 ensures that the data traffic does not exceed the session bandwidth. Towards this end, the controller 108 includes delay injectors 112. When the data traffic in any direction becomes greater than the session bandwidth, the delay injectors 112 inject delays into data packets being transferred and reduce the bandwidth consumption.

Furthermore, the controller 108 monitors the data traffic to keep a track of applications deployed in the remote session. The bandwidth allocator 110 may change the allocated session bandwidth based on the application being deployed. For example, if the client 102-1 requests deployment of a multimedia application, the bandwidth allocator 110 may allocate a greater session bandwidth while the multimedia application is deployed over the remote session.

When another client, such as the client 102-2, requests a remote connection with the remote server 104, the controller 108 processes the request in a similar manner as described above. The controller 108 can establish the new remote session by either opening a new port, or creating another remote session on a port that is in use by a previously established remote session. These and other methods employed by the controller 108 to establish and monitor multiple remote sessions between the remote server 104 and the clients 102 are explained in detail below.

It may be noted that a client, such as the client 102-N, may request direct access to the server 104 and may be allowed to bypass the controller 108 based on privileges associated with the client 102-N. Further, it will be appreciated that though the controller 108 is described as being included in the remote server 104, the controller 108 may be hosted on a separate computing device.

Figure 2:
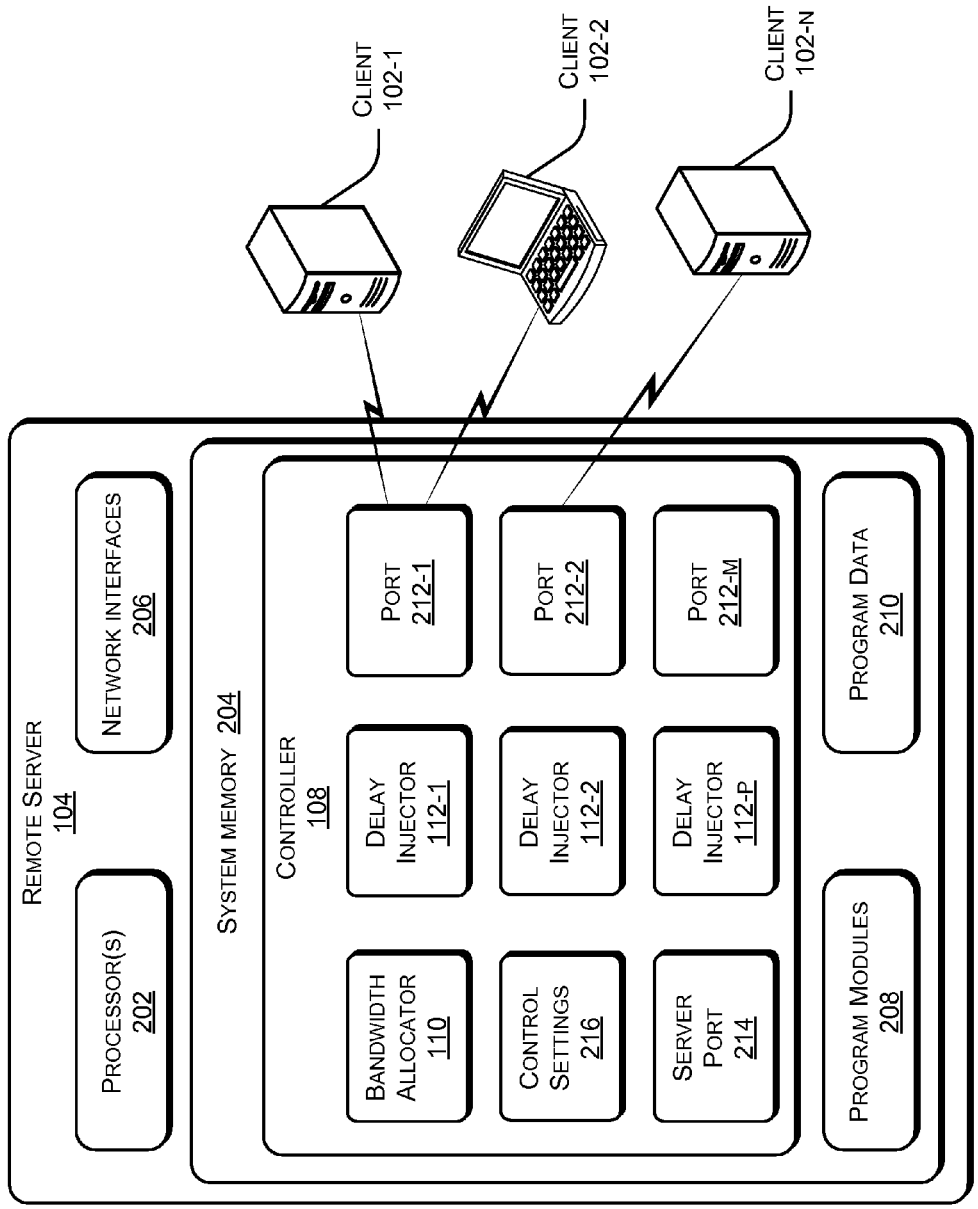
FIG. 2 is a block diagram illustrating an exemplary remote server that includes the bandwidth and latency controller.

FIG. 2 shows an exemplary illustration of the remote server 104 that implements bandwidth and latency control. The remote server 104 includes one or more processor(s) 202 coupled to a system memory 204, and network interfaces 206.

The processor(s) 202 may include, for example, microprocessors, microcomputers, microcontrollers, multi-core processors, etc. The processor(s) 202 are configured to fetch and execute computer-program instructions stored in the system memory 204. The system memory 204 includes computer-readable media in the form of volatile memory, such as Random Access Memory (RAM) and/or non-volatile memory, such as Read Only Memory (ROM) or flash RAM. The network interfaces 206 provide connectivity to a wide variety of networks, such as the network 106, and protocol types such as wire networks (e.g., LAN, cable, etc.) and wireless networks (e.g., WLAN, cellular, satellite, etc.)

The system memory 204 includes the controller 108, program modules 208 and program data 210. The program modules 208 include various applications hosted by the remote server 104 and other programs such as an Operating System (OS) to provide a runtime environment for network communication between multiple users, and so forth. The program data 210 includes data associated with the various applications and programs stored in the program modules 208 and other data that may be required by the controller 108 or the program modules 208 for execution of their functions.

The controller 108 includes a bandwidth allocator 110, delay injectors 112-1, 112-2, . . . , 112-P (collectively referred to as delay injectors 112), ports 212-1, 212-2, . . . , 212-M (collectively referred to as ports 212), and a server port 214 for implementing bandwidth and latency control.

In one implementation, the controller 108 receives a request from a client, such as the client 102-1, to establish a remote session. The controller 108 determines whether the remote server 104 can support a new remote session. On receiving a confirmation, the controller 108 opens a port such as the port 212-1, and establishes a remote session between the client 102-1 on the port 212-1 and the remote server 104 on the server port 214.

The bandwidth allocator 110 in the controller 108 determines the bandwidth available for the remote session. The bandwidth allocator 110 also determines the size of bandwidth that may be allocated to the remote session from the control settings 216. The control settings 216 include predetermined bandwidths that may be numerical values of bandwidth or percentages of available bandwidth that may be allocated to a remote session based on parameters such as privileges associated with the client connected in the remote session, type of application deployed, etc.

The bandwidth allocator 110 then allocates a session bandwidth to the remote session based on a comparison of available bandwidth and predetermined bandwidth. For example, a client with administrative privileges may be allocated a session bandwidth substantially higher than other clients. In another example, a remote session of a client with administrative privileges may be allowed to override other remote sessions and use all the bandwidth available.

Therefore, control settings 216 enable prioritization of the remote sessions. For a high priority connection, such as an administrative connection, the bandwidth allocation will be higher than that of low priority connections.

Once the remote session is established and the session bandwidth is allocated, the controller 108 forwards data traffic between the client 102-1 and the remote server 104. In case the data traffic in the remote session starts exceeding the allocated session bandwidth, the controller 108 injects delays into data packets being transferred and controls the bandwidth being consumed. For this, the controller 108 also can use delay injector 112-1.

Further, the controller 108 monitors the data traffic to determine the type of application deployed. The bandwidth allocator 110 can vary the session bandwidth based on the type of application deployed and corresponding settings stored in the control settings 216.

In one implementation, when the controller 108 receives a request to establish a remote session from a new remote client, the controller 108 determines whether the new remote client is a part of any user group for which a remote session exists. Such a determination can be made from the control settings 216. If the new remote client is found to be a part of such a user group, the controller 108 establishes the remote session for the new remote client via the port used by other member(s) of the user group. Alternatively, the controller 108 establishes the remote session for the new remote client by opening a new port.

For example, the controller 108 may determine that the client 102-2 is a part of a user group that includes the client 102-1. In such a case, as shown in FIG. 2, the controller 108 establishes the remote session for the client 102-2 at the port 212-1, which is in use by the client 102-1. This is possible because the controller 108 forwards the network traffic between the clients 102 and the remote server 104 based on not only the port number, but also a client identification or ID with which the remote session is established. Furthermore, a delay injector, such as the delay injector 112-1 may be dedicated to injecting delays in data packets transferred via the port 212-1. The controller can thus regulate the total bandwidth consumed by different user groups and control latency in the network.

In another example, the controller 108 may determine that the client 102-N is not a part of the user group that includes the client 102-1. In such a case, as shown in FIG. 2, the controller establishes the remote session for the client 102-N via a new port, such as port 212-2.

In another implementation, the controller 108 may open a new port for every new remote session without regard to the user group to which the client belongs and control the bandwidth consumed by each remote session. In such a case, the delay injectors 112 may each inject delays in data packets transferred over different remote sessions.

Such a remote server 104, that includes the controller 108, may also be used to test deployment of applications over a remote session. For example, an administrator may need to test the stability of an application when deployed over a remote session that has a small session bandwidth. For this, the administrator can establish a remote session over a port, such as port 212-M, and adjust the control settings 216, so that the desired small session bandwidth is allocated to the remote session by the bandwidth allocator 110. The administrator can then test the stability and working of the application over the remote session that is adapted to the desired test conditions.

Figure 3:
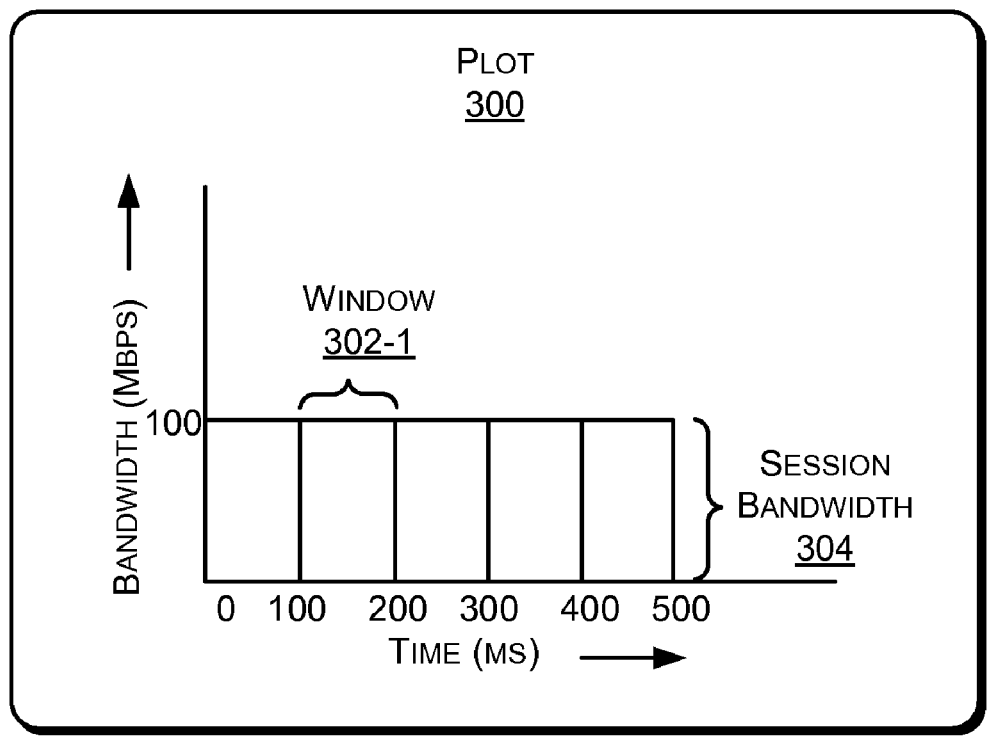
FIG. 3 is a graph illustrating an exemplary allocation of session bandwidth.

FIG. 3 shows a graphical representation 300, of session bandwidth allocated to a remote session by a controller vs. time. Data transfer in the remote session occurs in the form of data packets transferred in various windows of time 302, such as window 302-1. Session bandwidth 304 is the bandwidth allocated by the controller for data transfer in the remote session. The controller regulates the amount of data transferred in each window 302 so that the bandwidth consumed is less than the session bandwidth 304.

For example, in the remote session illustrated in plot 300, the session bandwidth 304 is 100 Mbps (mega bits per second), and the size of each window 302 is 100 ms (milliseconds). In such a case, 10 Mb of data can be transferred in one window of time. If the client or server requests transfer of data packets that are cumulatively greater than 10 Mb in size, the controller can inject delays into data packets such that not more than 10 Mb data is sent in one window and the remaining data is sent in subsequent windows.

In another example, the session bandwidth 304 may be increased if the client requests dedicated bandwidth for a short time to deploy a large application or for heavy data transfer such as transfer of multimedia files. Such a change in allocated session bandwidth may occur according to control settings available to the controller, such as control settings 216 available to the controller 108.

Exemplary Methods

Exemplary processes for bandwidth and latency control in a remote computing environment are described with reference to FIGS. 1-3. These processes may be described in the general context of computer executable instructions. Generally, computer executable instructions can include routines, programs, objects, components, data structures, procedures, modules, functions, and the like that perform particular functions or implement particular abstract data types. The processes may be practiced in a distributed computing environment where functions are performed by remote processing devices that are linked through a communications network. In a distributed computing environment, computer executable instructions may be located in both local and remote computer storage media, including memory storage devices.

Figure 4:
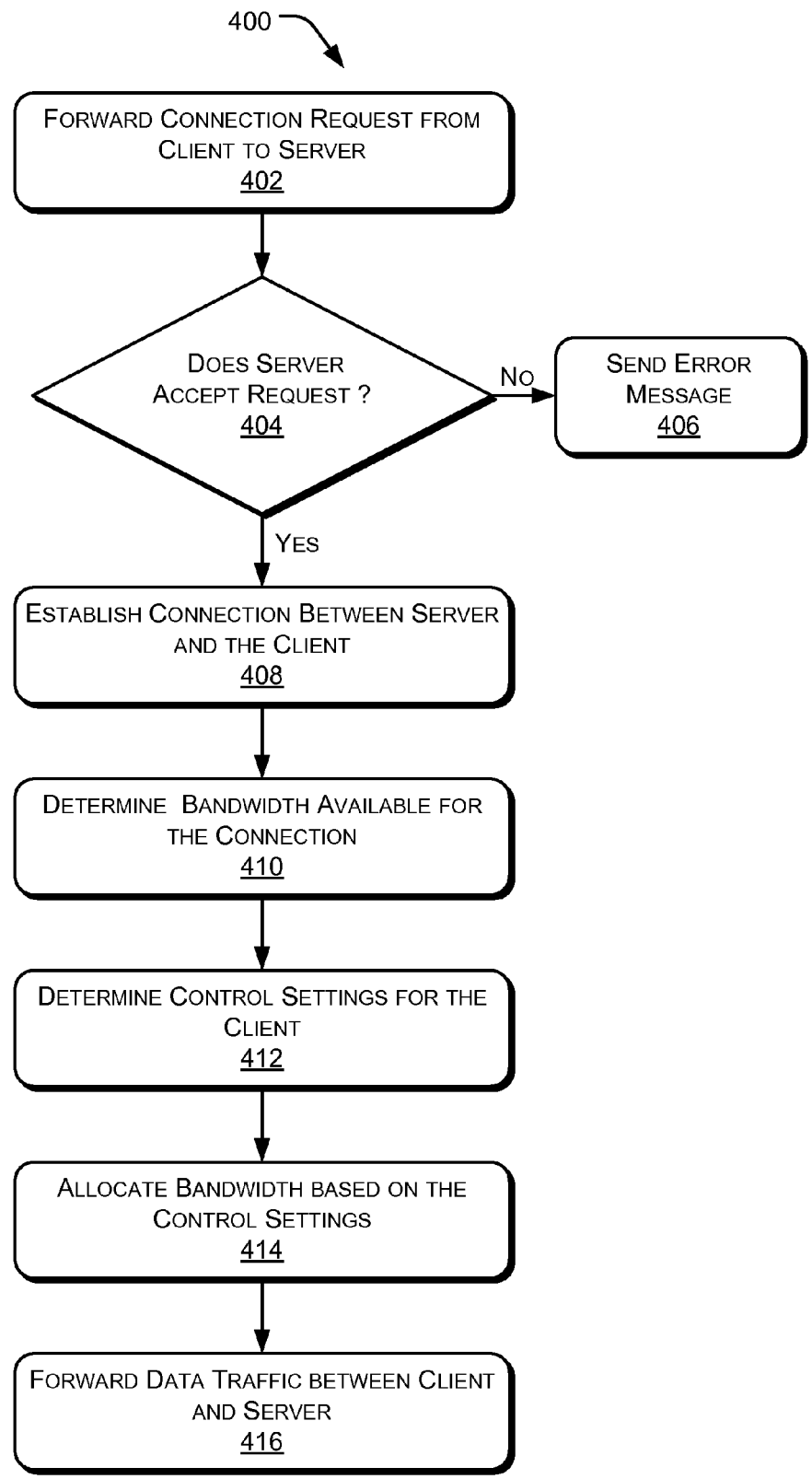
FIG. 4 is a flow chart illustrating an exemplary process for allocating bandwidth to a new remote client connection.

FIG. 4 illustrates an exemplary method 400 for allocation of bandwidth in a remote computing environment. The process 400 is illustrated as a collection of blocks in a logical flow graph, which represents a sequence of operations that can be implemented in a hardware, software, or a combination thereof. In the context of software, the blocks represent computer instructions that, when executed by one or more processors, perform the recited operations.

The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 402, a request is received from a client to establish a connection with the remote server. In one implementation, a controller 108 may receive a request from a client 102 to connect to a remote server 104.

At block 404, a determination is made as to whether the remote server accepts the request. This may be performed by the controller 108. If the remote server accepts the requests, i.e. the 'yes' branch from block 404, then the process proceeds further to block 408. Otherwise the process follows the 'no' branch to block 406. At block 406, an error message may be sent to the client notifying the client that the connection could not be established.

At block 408, if the server 104 accepts the connection request, a remote session may be established between the remote server and the client. This establishing may be performed by the controller 108. For this, the controller 108 may open a new port and establish the connection to the client via the new port. Alternatively, the controller may establish the connection via a previously opened port. For example, if the client is a member of a client group that is using a previously opened port, the controller may establish the connection via the same port.

At block 410, a determination is made as to bandwidth available for the remote session. This determination may be performed by controller 108. In one implementation, the controller includes a bandwidth allocator that determines the available bandwidth. For example, the controller 108 employs a bandwidth allocator 110 to determine the available bandwidth.

At block 412, a determination is made as to control settings corresponding to the client, based on which a predetermined bandwidth can be ascertained for allocation to the remote session. This may be performed by the controller 108. In one implementation, the controller 108 stores the various control settings from which the predetermined bandwidth can be ascertained. For example, the bandwidth allocator 110 in the controller 108 can determine the predetermined bandwidth from the control settings 216. The control settings may be specified by, for example, an administrator and can take into account considerations such as priority or privileges associated with the client.

At block 414, an allocation is performed as to a session bandwidth to the remote session based on the predetermined bandwidth and the available bandwidth. This may be performed by controller 108. Therefore, the controller 108 allocates the session bandwidth based on the control settings. Such an allocation of session bandwidth helps in prioritization of remote sessions by allocating a higher session bandwidth to clients having a higher priority.

At block 416, data traffic is forwarded in the remote session between the server and the client. This may be performed by controller 108. Therefore, a new path is used for communication between the client and the remote server, which passes via the controller. This allows the controller to regulate the bandwidth consumed by the client and the latency in the network.

Figure 5:
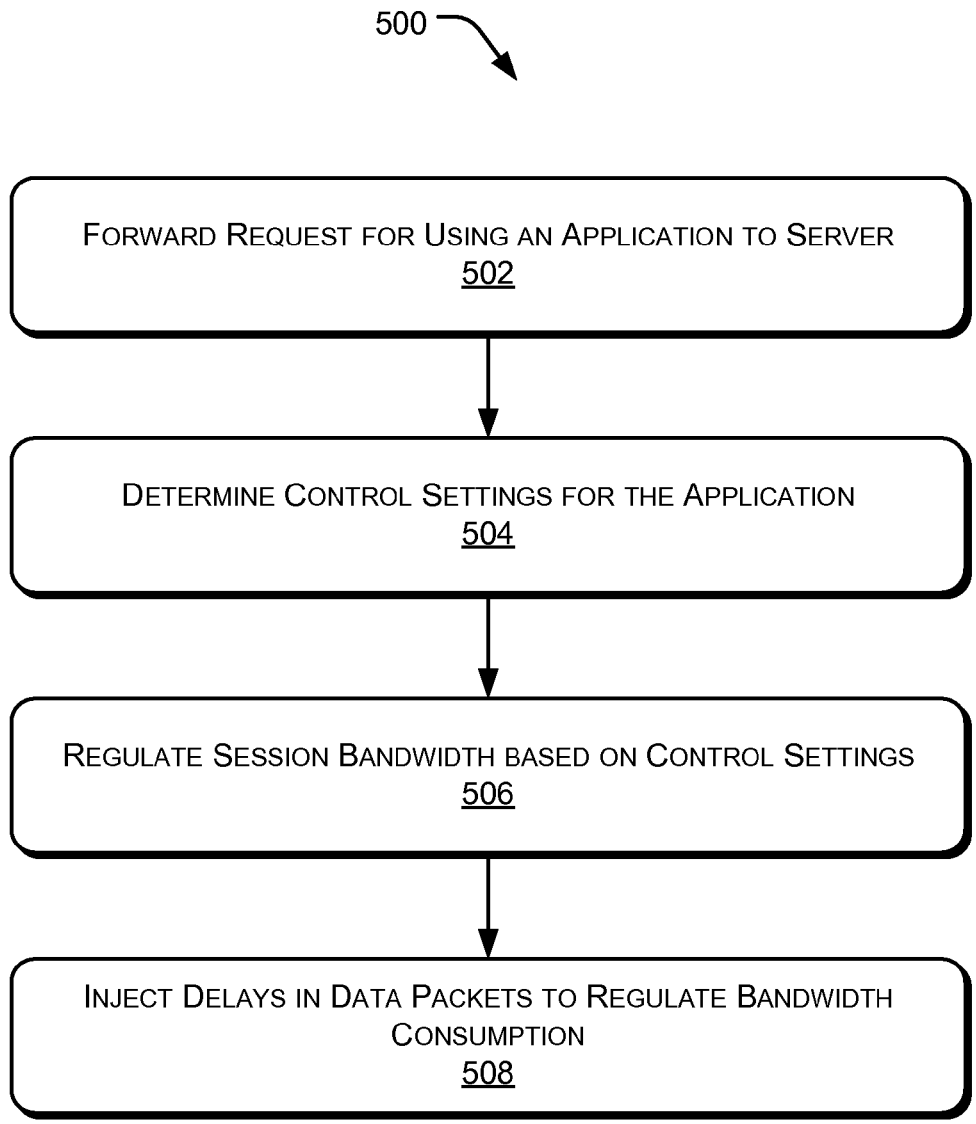
FIG. 5 is a flow chart illustrating an exemplary process for allocating bandwidth based on the application in use.

FIG. 5 illustrates an exemplary method 500 for regulating bandwidth and latency in a remote session between a client and a remote server. The method 500 may be performed by controller 108.

At block 502, a request is forwarded for deploying an application from the client to the remote server. For example, the controller 108 can forward a request from the client 102 to the remote server 104.

At block 504, a determination is made as control settings corresponding to the application. This includes determining the session bandwidth allocated to the remote session and the resource requirement of the application. For example, the bandwidth allocator 110 in the controller 108 can determine from the control settings 216 whether any dedicated bandwidth is to be allocated to the remote session for deploying the application. If the application is a heavy application, such as a multimedia application, or requires large volumes of data transfer, the control settings may recommend allocating a higher session bandwidth while the application is deployed.

At block 506, regulating is performed as to the session bandwidth associated with the remote session based on the control settings determined above. For example, in one implementation, the bandwidth allocator 110 may determine that bandwidth in excess of the session bandwidth need not be allocated for deploying the application. In such a case, the controller 108 does not change the session bandwidth allocated to the remote session. In another case, if the bandwidth allocator 110 determines that extra bandwidth is to be allocated, the session bandwidth is changed accordingly.

At block 508, delays are injected into data packets transferred in the remote session to regulate bandwidth consumption. This can ensure that the bandwidth consumed does not exceed the allocated session bandwidth. For example, the controller 108 employs delay injectors 112 to inject delays into data packets and control bandwidth consumption.

It will be understood that a process similar to the process 500 can be used if a client requests the remote server or controller for greater session bandwidth to transfer data while using a remote application.

Thus a remote client can be allocated a dedicated session bandwidth and it can be ensured that the client does not consume bandwidth greater than the session bandwidth even when using large applications or transferring large amount of data. Therefore, the various clients in the remote computing environment do not compete for bandwidth and the latency in the network can be controlled.

Figure 6:
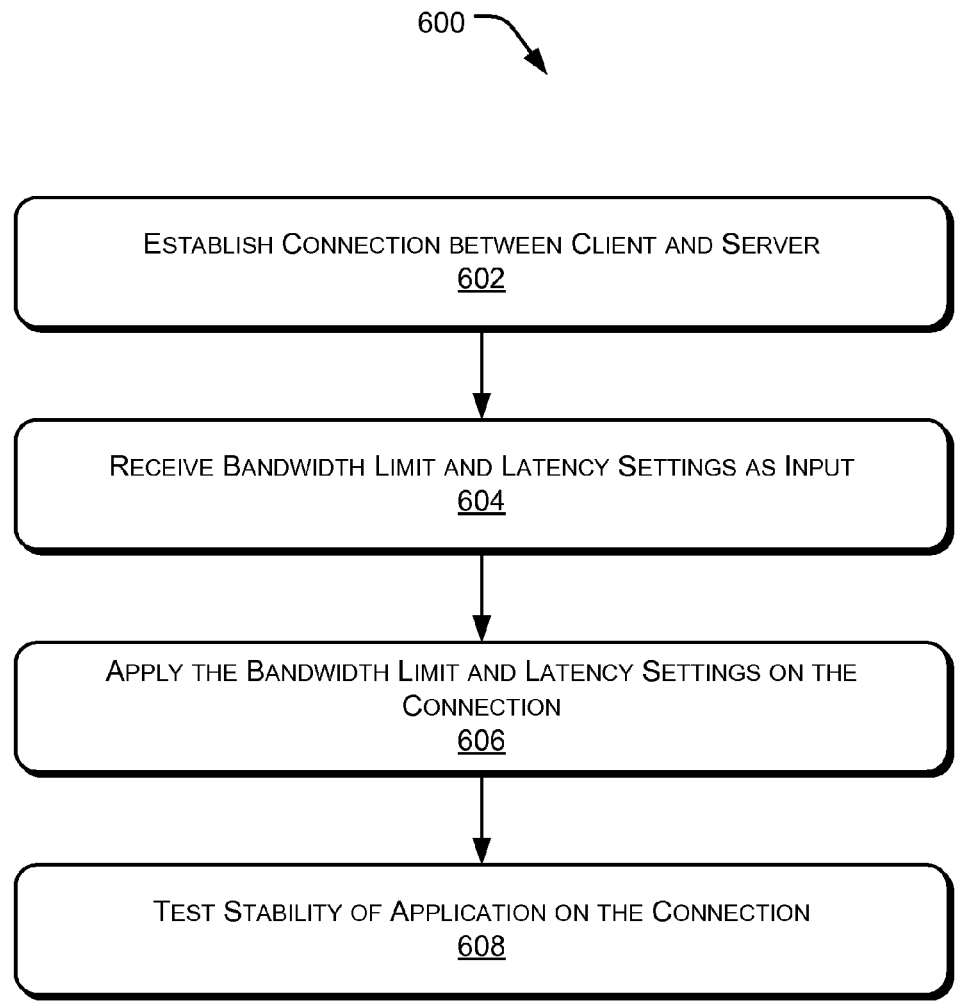
FIG. 6 is a flow chart illustrating an exemplary process for testing deployment of applications in a remote environment using the controller.

FIG. 6 illustrates an exemplary method for testing the stability and working of an application when deployed remotely. Steps may be performed by the controller 108.

At block 602, a connection is established between a client and the remote server. For example, the controller 108 can establish a connection, i.e. set up a remote session, between the client 102-1 and the remote server 104.

At block 604, bandwidth and latency settings are received for the remote session. These settings may be received from, for example, an administrator, or from control settings stored in the controller, etc.

At block 606, the bandwidth and latency settings are applied for the remote session. For this, the controller 108 may allocate a session bandwidth, which corresponds to the bandwidth limit, to the remote session. Further, the controller injects delays into data packets transferred in the remote session to apply the latency settings. In one implementation, the controller 108 employs a bandwidth allocator 110 and delay injectors 112 to apply the bandwidth limit and latency settings.

At block 608, the stability and working of the application over the remote session are tested under conditions of the applied bandwidth limit and latency settings. For example, various features of the application may be tested to determine whether the application can be deployed under such conditions.

It will be understood that the process 600 can be used to determine the minimum bandwidth requirements, or optimal network conditions under which an application may be deployed remotely. Further, the process 600 may be used to develop an application or various features in the application so that the application is stable when deployed remotely.

Various modules and techniques are described herein in the general context of computer-executable instructions, such as program modules, executed by one or more computers or other devices. Generally, program modules include routines, programs, objects, components, data structures, etc., that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing bandwidth and latency control in a remote computing environment have been described in language specific to structural features and/or methods, it is to be understood that the subject of the appended claims is not necessarily limited to the specific features or methods described. Rather, the specific features and methods are disclosed as exemplary implementations for leveraging the bandwidth and latency controller.

What is claimed is:

1. A server computer comprising:
    a memory;
    a processor operatively coupled to the memory; and
    a controller stored in the memory and executed by the processor to control bandwidth distribution and latency in a remote computing environment, the controller including:
        at least one bandwidth allocator that allocates a session bandwidth to a remote session between the server computer and a client device in the remote computing environment, based on a size of available bandwidth and a predetermined size of bandwidth for the client device, the session bandwidth allocated to test stability and functionality of an application over the remote session to determine at least one minimum bandwidth requirement for remote deployment of the application, the controller operating to test stability and working of one or more applications over the remote session under at least one condition of the allocated session bandwidth, wherein the testing is for development of one or more features of the one or more applications under a limitation of the allocated session bandwidth to determine that the one or more applications are stable when deployed remotely; and
        at least one delay injector that injects one or more delays into one or more data packets transferred between the server computer and the client device when a bandwidth consumption in the remote session is greater than the allocated session bandwidth.

2. The server computer of claim 1, wherein the predetermined size of bandwidth is one of a predetermined percentage of the available bandwidth or a numerical value of bandwidth size.

3. The server computer of claim 1, wherein the bandwidth allocator allocates the session bandwidth as the predetermined size of bandwidth based on a determination that the predetermined size of bandwidth is less than the available bandwidth.

4. The server computer of claim 1, wherein the at least one bandwidth allocator determines one or more privileges associated with the client device and allocates the session bandwidth based on the one or more privileges.

5. The server computer of claim 1, wherein the controller sets up a path of communication between the server computer and the client device through the controller.

6. The server computer of claim 1, wherein the at least one delay injector injects the one or more delays into the one or more data packets to regulate an amount of data transferred in one or more time windows of the remote session.

7. The server computer of claim 1, wherein the controller monitors data traffic to track the one or more applications deployed in the remote session.

8. The server computer of claim 7, wherein the bandwidth allocator allocates the session bandwidth further based on a type of the one or more applications.

9. The server computer of claim 1, wherein the controller establishes the remote session with the client device by opening a new port or by establishing the remote session on a port used by a previously established remote session.

10. A method performed at a computing device for allocating bandwidth in a remote computing environment comprising:
    under control of one or more processors with executable instructions, receiving a request from a client to establish a connection;
    establishing the connection to the client using a port that is determined based at least in part on whether the client is in a user group;
    determining available bandwidth for a remote session to the client;
    determining one or more control settings corresponding to the client, the control settings including a predetermined bandwidth for the client;
    allocating a session bandwidth to the remote session based on the predetermined bandwidth and the available bandwidth;
    injecting one or more delays into one or more data packets forwarded to the client, when data traffic in the remote session exceeds the allocated session bandwidth; and
    testing stability and working of one or more applications over the remote session under at least one condition of the allocated session bandwidth, wherein the testing is for development of one or more features of the one or more applications under a limitation of the allocated session bandwidth to determine that the one or more applications are stable when deployed remotely.

11. The method of claim 10, wherein establishing the connection includes connecting to a new port or a previously opened port.

12. The method of claim 10, wherein the determining the one or more control settings includes storing the one or more control settings from which the predetermined bandwidth can be ascertained.

13. The method of claim 10, further comprising forwarding the one or more data packets through a path regulated by a controller.

14. The method of claim 10, further comprising receiving one or more bandwidth and latency settings for the remote session, and applying the one or more bandwidth and latency settings to the remote session.

15. A method performed at a server computer, for regulating bandwidth and latency comprising:

under control of one or more processors with executable instructions, receiving a request for deploying one or more applications;

determining one or more control settings corresponding to the one or more applications;

regulating a session bandwidth associated with a remote session between a client device and the server computer;

testing stability and working of the one or more applications over the remote session under at least one condition of the regulated session bandwidth, wherein the testing is for development of one or more features of the one or more applications under a limitation of the regulated session bandwidth to determine that the one or more applications are stable when deployed remotely; and injecting one or more delays into one or more data packets transferred during the remote session, to ensure that a rate of data transfer in the remote session conforms with the session bandwidth.

16. The method of claim 15, wherein determining the one or more control settings includes determining the session bandwidth allocated to the remote session and a resource requirement of the one or more applications.

17. The method of claim 15, wherein determining the one or more control settings includes allocating a higher session bandwidth while the one or more applications are deployed.

18. The method of claim 15, further comprising:

receiving one or more bandwidth and latency settings for the remote session; and applying the bandwidth and latency settings to the remote session.

* * * * *